May 2, 1939.   P. B. KREMER   2,156,991
ADJUSTABLE PLOWSHARE
Filed Nov. 17, 1937
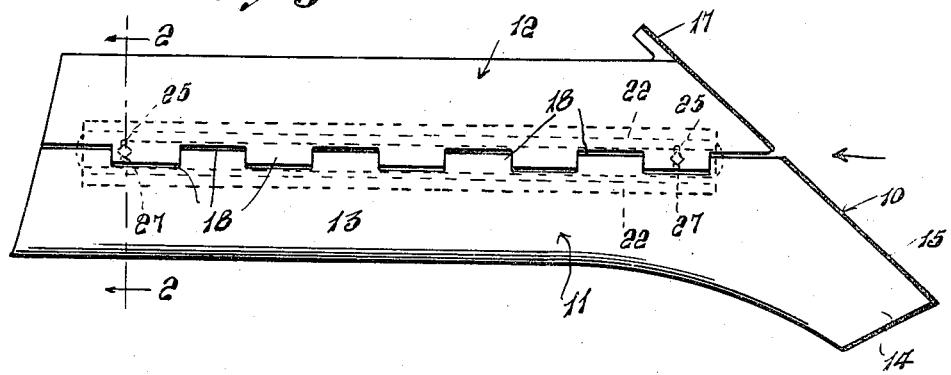
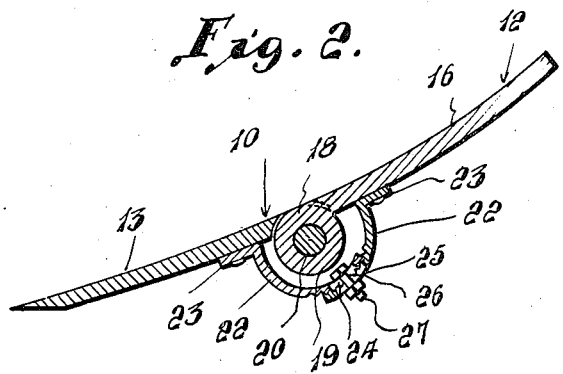
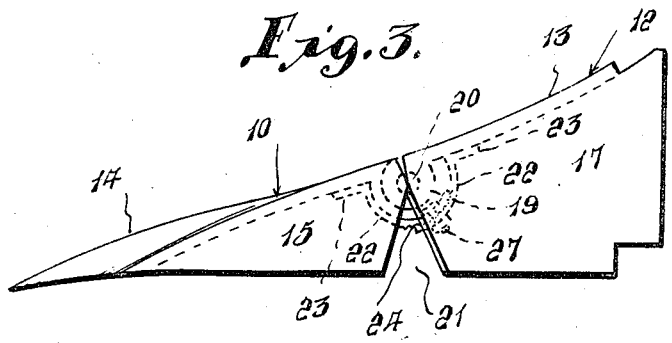
Inventor
P. B. Kremer
By L. F. Randolph
Attorney Patented May 2, 1939

2,156,991

UNITED STATES PATENT OFFICE 2,156,991

ADJUSTABLE PLOWSHARE

Philip B. Kremer, Huntingtown, Md.

Application November 17, 1937, Serial No. 175,119

7 Claims. (Cl. 97—125)

This invention relates to an improved plowshare.

An important object of this invention is to provide an improved plowshare which may be adjusted to raise and lower the plow point to compensate for wear, or to increase or decrease the depth of the point to produce a deeper furrow or to compensate for the hardness of the ground.

Another object of the invention is to form the plow blade and landside in two sections pivotally connected and provided with clamping means to hold the sections in adjusted position to raise and lower the plow pont without removing the share from the standard.

Other objects and advantages of the invention will hereinafter become more fully apparent from the following specification of which the drawing forms a part, and wherein:

Figure 1 is a side elevational view of the blade side of the plowshare,

Figure 2 is a cross sectional view on the line 2—2 of Figure 1, and

Figure 3 is a side elevational view of the landside side of the plowshare looking in the direction of the arrow at the right of Figure 1.

Referring more particularly to the drawing wherein like reference characters indicate corresponding parts throughout, 10 designates generally the plowshare comprising the sections 11 and 12. The upper section 12 is suitably secured to the plow standard in any conventional manner.

Section 11 comprises the blade portion 13, the plow point 14, and the landside portion 15. Section 12 comprises the blade portion 16 and the landside portion 17.

The blade portions 13 and 16 are provided with spaced staggered strips 18 which are bent inwardly and around to form the loop portions 19 as seen in Fig. 2, which interengage to receive a rod 20 which extends through loops 19 to hinge sections 11 and 12 together. The landside portions 15 and 17 are provided with a cut-out portion 21 formed by cutting away the abutting edges of portions 15 and 17 to form an inverted V-shaped space to provide for the movement of the sections 11 and 12.

Secured to the underside of the portions 13 and 16 are arcuately shaped members 22 having flanges 23 which are riveted or otherwise secured to portions 13 and 16. The members 22 substantially overlap and are provided in their abutting faces with longitudinally extending teeth 24 adapted to interengage or mesh. The members 22 extend substantially the length of the portions 13 and 16, and one of the members 22 is provided with slots 25 to aline with openings 26 in the other member 22. Nuts and bolts 27 extend through the alined openings 26 and slots 25 permitting said members 22 to be moved relatively to each other and clamped in adjusted position by nuts and bolts 27 to adjustably position the sections 11 and 12.

From the foregoing it will be obvious that when the share 10 is attached to a plow standard that the sections 11 and 12 can be adjusted relatively to each other by loosening nuts 27 and moving section 11 up or down, after which nuts 27 can be tightened to clamp members 22 together, with teeth 24 interengaging to prevent relative movement of the sections.

In this manner the point 14 can be raised or lowered for deep or shallow plowing, or to compensate for wear without effecting the connection of share 10 to the standard.

The plowshare 10 is only intended to illustrate the invention, other types of plows could be equipped with the invention, which is capable of various changes and modifications without departing from its spirit and scope.

I claim as my invention:

1. A device of the class described comprising a plowshare formed of sections pivotally connected lengthwise, and means to adjust the lower part thereof to compensate for wear on the plow point.

2. A plowshare comprising a blade and landside terminating in a plow point, said blade and landside being divided into two sections, the portions of the sections forming the blade being hinged together, and adjustable clamping means mounted on the underside of said blade sections to clamp the sections in adjusted position.

3. In a plowshare, a blade and landside divided to form sections, the abutting edges of said blade sections being hinged together, arcuately shaped members secured to the back side of said blade sections and having overlapping portions provided with interengaging teeth to hold said blade sections in adjusted position, and said landside sections being provided with a cut-out portion to permit the sections to be adjusted to raise or lower the plow point.

4. A plowshare comprising upper and lower sections hinged together to form an adjustable mounting for the plow point, arcuately shaped members secured to the underside of said sections and overlapping each other, the overlapping portions of said members having teeth arranged to mesh, and fastening means to clamp said members in adjusted position for adjusting the elevation of the plow point.

5. A plowshare comprising upper and lower sections, the blade portions of said sections having spaced interengaging loop portions, a rod extending through said loop portions forming a hinge, said landside portion of said sections having corresponding cut-out portions to provide for the movement of said sections, arcuately shaped members secured to the underside of said sections and having overlapping portions, and fastenings connecting said overlapping portions to hold the sections in adjusted position to raise or lower the plow point.

6. A plowshare comprising a blade and landside divided to form upper and lower sections, means pivotally connecting the blade portions of said sections for angularly adjusting said sections relatively to each other.

7. In a device of the class described, a plowshare comprising a blade and landside formed of pivoted sections, and means for adjustably clamping said sections relatively to each other.

PHILIP B. KREMER.